(12) United States Patent
Tsai et al.

(10) Patent No.: US 11,878,471 B2
(45) Date of Patent: Jan. 23, 2024

(54) MAGNETIC POWDER DISPENSING STRUCTURE FOR TABLET PRINTING

(71) Applicants: Chih-Chia Tsai, New Taipei (TW);
Yu-Hsien Hu, New Taipei (TW);
Chao-Yi Chen, New Taipei (TW)

(72) Inventors: Chih-Chia Tsai, New Taipei (TW);
Yu-Hsien Hu, New Taipei (TW);
Chao-Yi Chen, New Taipei (TW)

(73) Assignee: TAIWAN MERCURY MEDICAL CORPORATION, New Taipei (TW)

( * ) Notice: Subject to any disclaimer, the term of this patent is extended or adjusted under 35 U.S.C. 154(b) by 27 days.

(21) Appl. No.: 17/698,827

(22) Filed: Mar. 18, 2022

(65) Prior Publication Data

US 2023/0294360 A1  Sep. 21, 2023

(51) Int. Cl.
*B33Y 30/00* (2015.01)
*B33Y 40/00* (2020.01)
*B29C 64/321* (2017.01)
*B29C 64/35* (2017.01)

(52) U.S. Cl.
CPC ............ *B29C 64/35* (2017.08); *B29C 64/321* (2017.08); *B33Y 30/00* (2014.12); *B33Y 40/00* (2014.12)

(58) Field of Classification Search
CPC ....... B29C 64/35; B29C 64/321; B33Y 30/00; B33Y 40/00; A61J 3/00; A61J 3/06; A61J 3/10; A61K 9/2095
See application file for complete search history.

(56) References Cited

U.S. PATENT DOCUMENTS

| | | | | |
|---|---|---|---|---|
| 2010/0031882 | A1* | 2/2010 | Abe | B29C 64/329 118/620 |
| 2010/0247742 | A1* | 9/2010 | Shi | B33Y 30/00 118/712 |
| 2011/0109016 | A1* | 5/2011 | Fuwa | B22F 3/004 264/460 |
| 2016/0368215 | A1* | 12/2016 | Miyano | B29C 64/218 |
| 2020/0055245 | A1* | 2/2020 | Kao | B29C 64/165 |
| 2021/0346962 | A1* | 11/2021 | Myerberg | B22F 10/80 |

\* cited by examiner

*Primary Examiner* — Joseph S Del Sole
*Assistant Examiner* — Baileigh Kate Darnell
(74) *Attorney, Agent, or Firm* — Che-Yang Chen; Law Office of Michael Chen

(57) ABSTRACT

A magnetic powder dispensing structure for tablet printing comprises a powder collecting device, a printing device, a guide rod device and a printing platform, the powder collecting device comprises a powder collecting box, a powder feeding device, a plurality of stirring rods, a plurality of rocker arms, a pressing rod, a driving motor and a first electromagnetic attraction device; the printing device comprises a second electromagnetic attraction device. The printing device and the powder collecting device are capable of moving laterally through the guide rod device, and capable of being magnetically attracted with each other or detached from each other by energizing or de-energizing the first electromagnetic attraction device and the second electromagnetic attraction device, thereby the powder collecting device can be driven when dispensing powder, and the printing device is capable of operating independently during printing.

8 Claims, 9 Drawing Sheets

MAGNETIC POWDER DISPENSING STRUCTURE FOR TABLET PRINTING

BACKGROUND OF THE INVENTION

Field of Invention

The invention relates to a tablet device, and more particularly to a magnetic powder dispensing structure for tablet printing.

Related Art

With the rapid development of science and technology, the production method of pill or tablet has changed from the traditional way of making through mold to the current combination of 3D printing technology. Through computer-aided 3D printing technology, ordinary tablet is made by stacking medicinal powder layer by layer.

In the existing 3D printing device for printing tablet, medicinal powder has to be placed in the powder collecting box. The powder collecting box is mainly combined with the printing device equipped with the nozzle. Therefore, in the process of powder dispensing and printing, the powder collecting box and the printing device operate synchronously, especially during the printing process. Due to the printing demand, the printing device has to move fast, but combination with the powder collecting box containing the medicinal powder makes the overall weight too heavy, which causes the guide rod device that combines with the printing device and drives the printing device to move to malfunction very easily or to have a short service life, which not only affects the mass production efficiency, but also indirectly increases the overall maintenance costs.

The detailed features and advantages of the invention will be described in detail in the following embodiments. The content is sufficient to enable any person having ordinary skill in the art to understand the technical content of the invention and implement it accordingly, and in accordance with the content, the claims and the drawings disclosed in this specification, any person having ordinary skill in the art can easily understand the related objects and advantages of the invention.

SUMMARY OF THE INVENTION

A main object of the invention is: a first electromagnetic attraction device and a second electromagnetic attraction device respectively disposed on a powder collecting device and a printing device are capable of being magnetically attracted with each other or detached from each other by being energized or de-energized, thereby the powder collecting device can be driven when dispensing powder, and the printing device is capable of operating independently during printing to improve an overall efficiency of powder dispensing and printing.

A secondary object of the invention is: through a swinging method of rocker arms in the powder collecting device, a pressing rod is capable of increasing a pressure on powder dispensing on a printing platform to improve a quality of compaction and make the powder more compact, and the pressing rod is capable of being driven by a driving motor to take away excessive powder and spread the powder flatly while rolling without the problem of excessive powder at different positions.

Another object of the invention is: a motor-driven powder dispensing roller in a powder feeding device is capable of dispensing powder more uniformly without the problem of uneven powder dispensing caused by dispensing powder directly by a conventional push block.

In order to achieve the above-mentioned objects, a magnetic powder dispensing structure for tablet printing of the invention comprises a powder collecting device including a powder collecting box for defining a powder dispensing outlet, a powder feeding device disposed in the powder collecting box and located at the powder dispensing outlet, a plurality of stirring rods disposed in the powder collecting box and driven to rotate by a transmission motor, a plurality of rocker arms respectively disposed on two sides of the powder collecting box, a pressing rod pivotally disposed between two of the rocker arms and driven by a driving motor, a cleaning device disposed on the powder collecting device and defining an air outlet corresponding to the pressing rod, and a first electromagnetic attraction device; and a printing device provided with a second electromagnetic attraction device capable of being energized to magnetically attract with the first electromagnetic attraction device or being de-energized to detach from the first electromagnetic attraction device, the printing device and the powder collecting device are set on a guide rod device, the printing device is capable of moving laterally through the guide rod device, the printing device is capable of magnetically attracting with the first electromagnetic attraction device via the second electromagnetic attraction device, so that the powder collecting device is capable of moving together laterally, and powder is dispensed onto a printing platform through the powder feeding device at the same time, the pressing rod butts against the printing platform and swings in a direction opposite to movement of the powder collecting device through the rocker arms, the powder collecting device completes powder dispensing and moves to an initial position, the first electromagnetic attraction device and the second electromagnetic attraction device are de-energized to detach from each other, and the printing device moves to the printing platform for printing.

According to one embodiment of the invention, further comprising a guide rail disposed below the pressing rod and disposed at a height lower than the printing platform, and a height difference between the guide rail and the printing platform is sufficient to match a swing range of the rocker arm.

According to one embodiment of the invention, wherein the powder feeding device comprises a powder dispensing roller pivotally disposed in the powder collecting box and located at the powder dispensing outlet, and a motor connected to the powder dispensing roller and driving the powder dispensing roller to rotate.

According to one embodiment of the invention, further comprising a connecting member connected between the pressing rod and the driving motor to transmit power.

According to one embodiment of the invention, wherein the connecting member is a belt or a chain.

According to one embodiment of the invention, wherein each of the stirring rods is provided with a helical disturbance plate.

According to one embodiment of the invention, further comprising a powder suction device disposed below the printing platform and provided with at least one powder suction tube and a collection device connected to the powder suction tube.

According to one embodiment of the invention, wherein one end of each of the stirring rods is provided with a gear, and the transmission motor is provided with a driving gear meshed with each of the gears, so that each of the stirring rods rotates forwardly and reversely.

DETAILED DESCRIPTION OF THE INVENTION

The following specific embodiments illustrate the implementation mode of the invention. Any person having ordinary skill in the art can easily understand the other advantages and efficacies of the invention from the content disclosed in this specification.

The structures, proportions and sizes depicted in the accompanied drawings in this specification are only used to match with the content disclosed in the specification for understanding and reading by those skilled in the art, and are not intended to limit the conditions that can be implemented by the invention, and therefore are not technically significant. Any structural modifications, changes in proportional relationship or adjustment of sizes without affecting the efficacies generated and the objects achieved by the invention, should still fall within the scope covered by the technical content disclosed by the invention. At the same time, the terms such as "one", "two", "above", etc. cited in this specification are only for clarity of description, and are not used to limit the scope of the invention, changes or adjustments in their relative relationships, without substantial changes to the technical content, should also be regarded as the scope of the invention that can be implemented.

Figure 1:
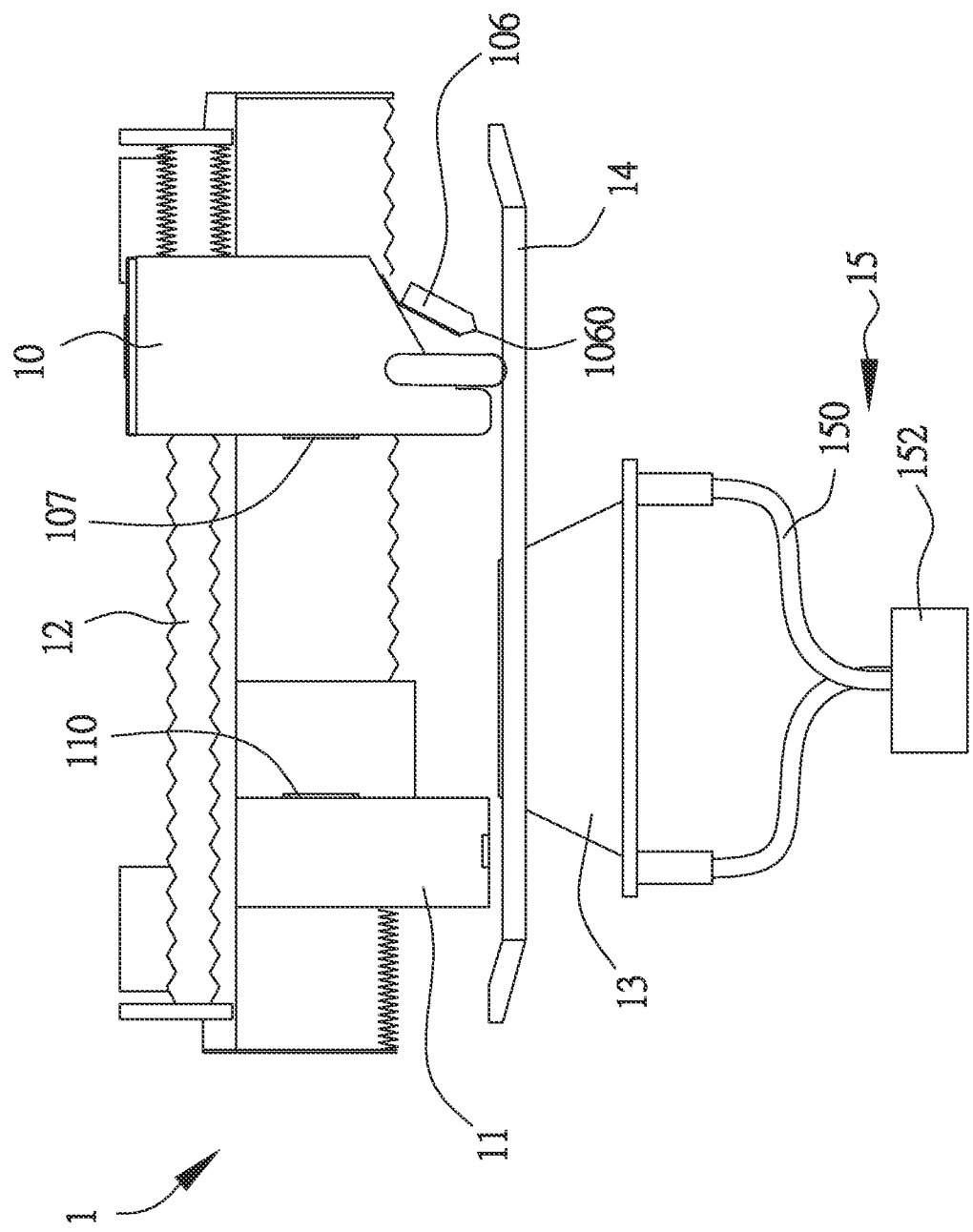
FIG. 1 is a structural side view of a preferred embodiment of the invention.
Figure 2A:
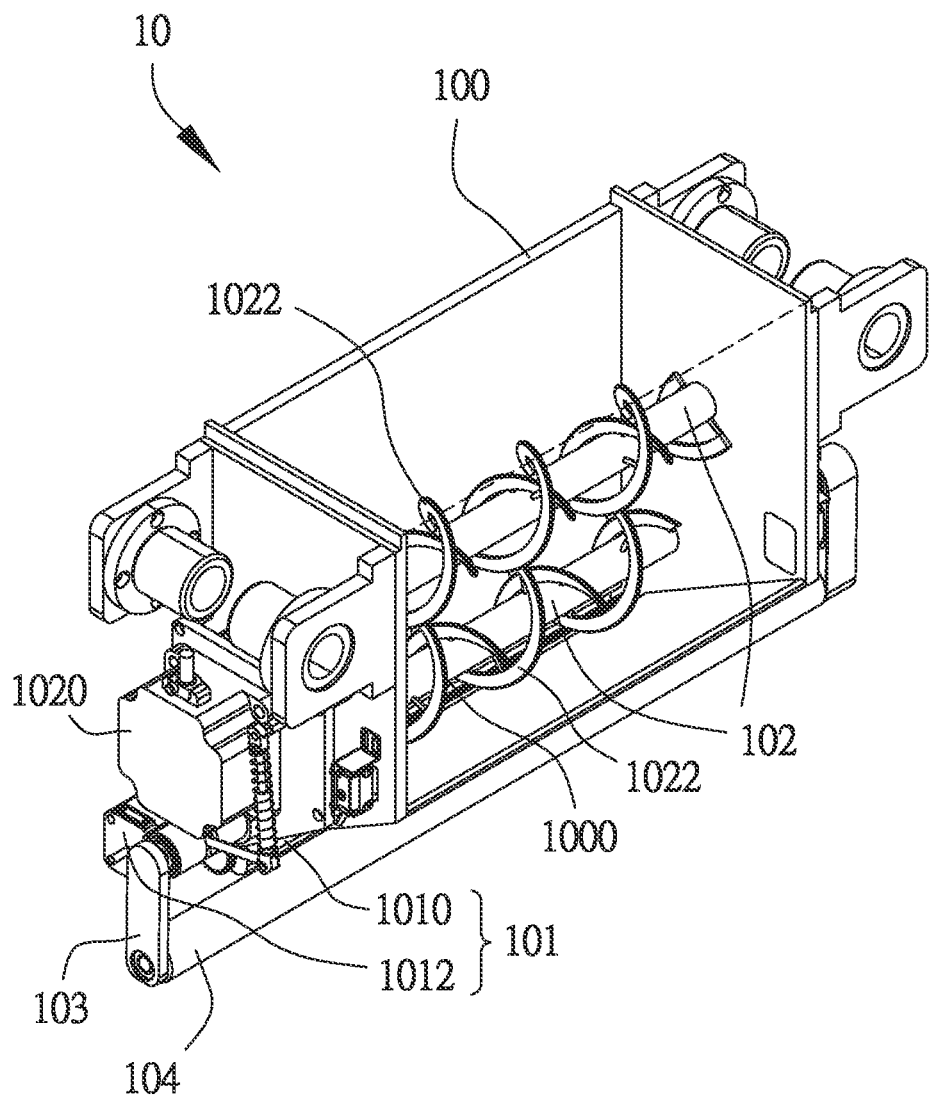
FIG. 2A is a first perspective view of an internal structure of a powder collecting device of the invention.
Figure 2B:
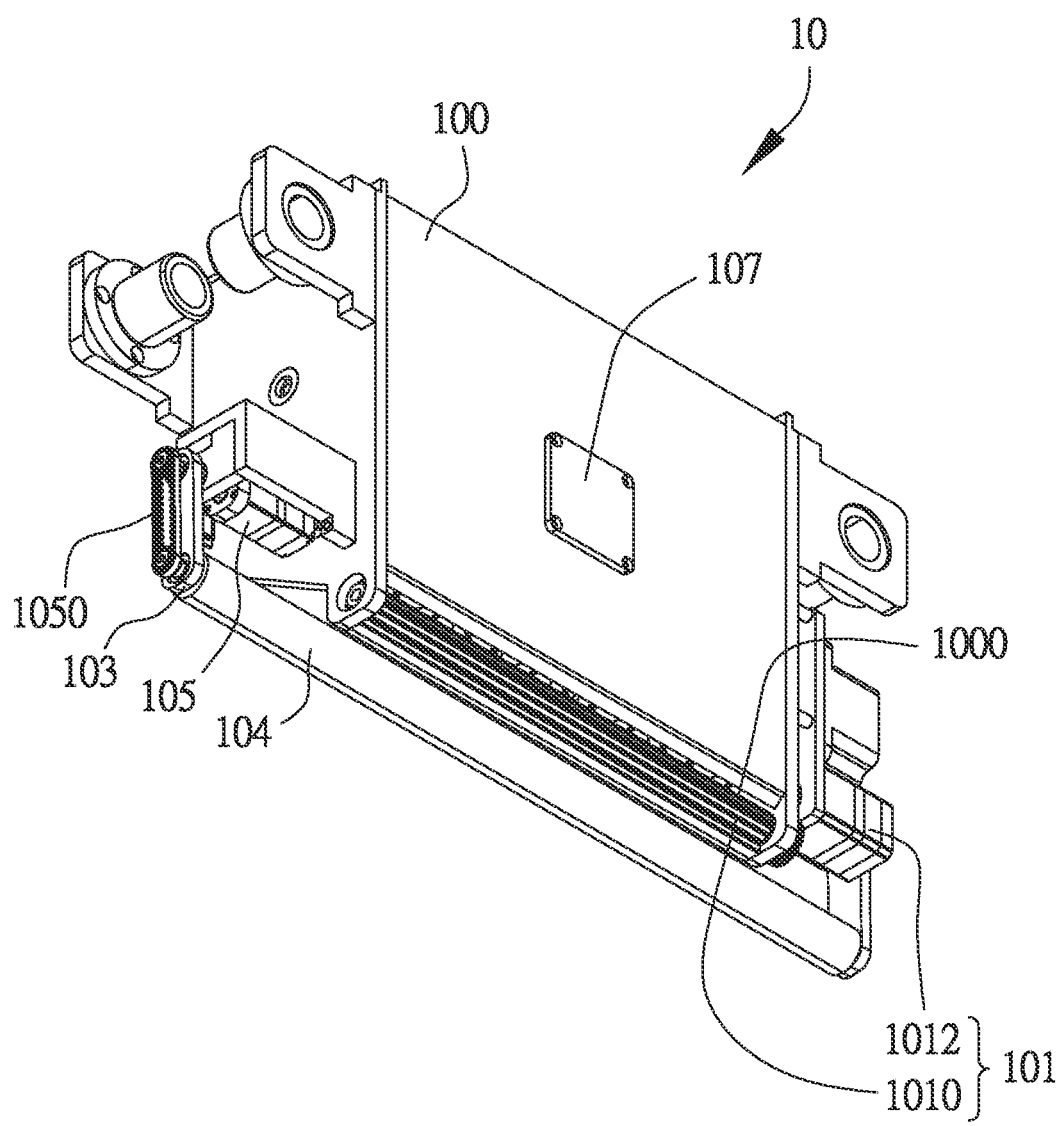
FIG. 2B is a second perspective view of an internal structure of the powder collecting device of the invention.
Figure 2C:
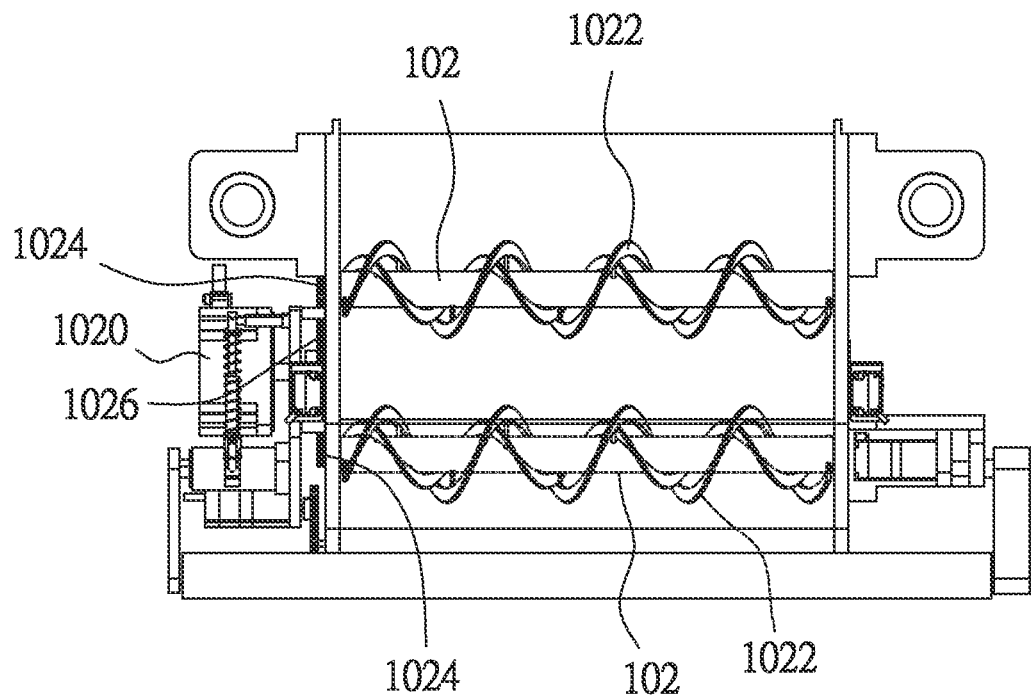
FIG. 2C is a schematic diagram of a transmission structure of stirring rods and a transmission motor of the invention.

Please refer to FIG. 1, FIG. 2A, FIG. 2B and FIG. 2C respectively for a structural side view; a first perspective view of an internal structure of a powder collecting device; a second perspective view of an internal structure of the powder collecting device; and a schematic diagram of a transmission structure of stirring rods and a transmission motor of a preferred embodiment of the invention. The invention is a magnetic powder dispensing structure for tablet printing. A magnetic powder dispensing structure 1 for tablet printing mainly comprises: a powder collecting device 10, a printing device 11, a guide rod device 12 and a printing platform 13, wherein the powder collecting device 10 comprises a powder collecting box 100, a powder feeding device 101, a plurality of stirring rods 102, a plurality of rocker arms 103, a pressing rod 104, a driving motor 105, a cleaning device 106 and a first electromagnetic attraction device 107 (part of a casing is omitted in FIG. 2 to clearly show the internal structures); the printing device 11 comprises a second electromagnetic attraction device 110, wherein the powder collecting box 100 is defined with a powder dispensing outlet 1000, the powder feeding device 101 is disposed in the powder collecting box 100 and is located at the powder dispensing outlet 1000, wherein the powder feeding device 101 comprises a powder dispensing roller 1010 pivotally disposed in the powder collecting box 100 and located at the powder dispensing outlet 1000, and a motor 1012 connected to the powder dispensing roller 1010 and driving the powder dispensing roller 1010 to rotate.

In addition, each of the stirring rods 102 is disposed in the powder collecting box 100, and is driven to rotate by a transmission motor 1020, each of the stirring rods 102 is provided with a helical disturbance plate 1022, and one end of each of the stirring rods 102 is provided with a gear 1024. The transmission motor 1020 is provided with a driving gear 1026 meshed with each of the gears 1024, so that each of the stirring rods 102 rotates forwardly and reversely.

Furthermore, the rocker arms 103 are respectively disposed on two sides of the powder collecting box 100, and a pressing rod 104 is pivotally disposed between two of the rocker arms 103. The pressing rod 104 is driven by the driving motor 105, a way in which the driving motor 105 drives the pressing rod 104 is achieved by transmitting power via a connecting member 1050 between the pressing rod 104 and the driving motor 105, and the connecting member 1050 can be in the form of a belt or a chain. An action mode of the rocker arm 103 is that after the powder collecting device 10 is driven by the printing device 11 to move in a direction toward the printing platform 13, the pressing rod 104 touches the printing platform 13 and at the same time each of the rocker arms 103 swings in an opposite direction, so the pressing rod 104 is capable of compressing powder dispensing on the printing platform 13, and the pressing rod 104 is driven by the driving motor 105, so the rotating pressing rod 104 is capable of flattening and compressing the dispensing powder, and excessive dispensing powder will be pushed to an end by the pressing rod 104. The powder collecting device 10 is additionally provided with a cleaning device 106, an air outlet 1060 of the cleaning device 106 is disposed corresponding to the pressing rod 104, when the pressing rod 104 is attached with too much medicinal powder, the cleaning device 106 can be used to spray off the medicinal powder.

The first electromagnetic attraction device 107 and the second electromagnetic attraction device 110 are capable of being magnetically attracted with each other or detached from each other by being energized or de-energized, thereby effectively controlling connection between the powder collecting device 10 and the printing device 11.

In addition to the above, a guide rail 14 and a powder suction device 15 are also provided, wherein the guide rail 14 is disposed below the pressing rod 104 and is disposed at a height lower than the printing platform 13, and a height difference between the guide rail 14 and the printing platform 13 is sufficient to match a swing range of the rocker arm 103. The powder suction device 15 is disposed below the printing platform 13 and is provided with at least one powder suction tube 150 and a collection device 152 connected to the powder suction tube 150.

Figure 3:
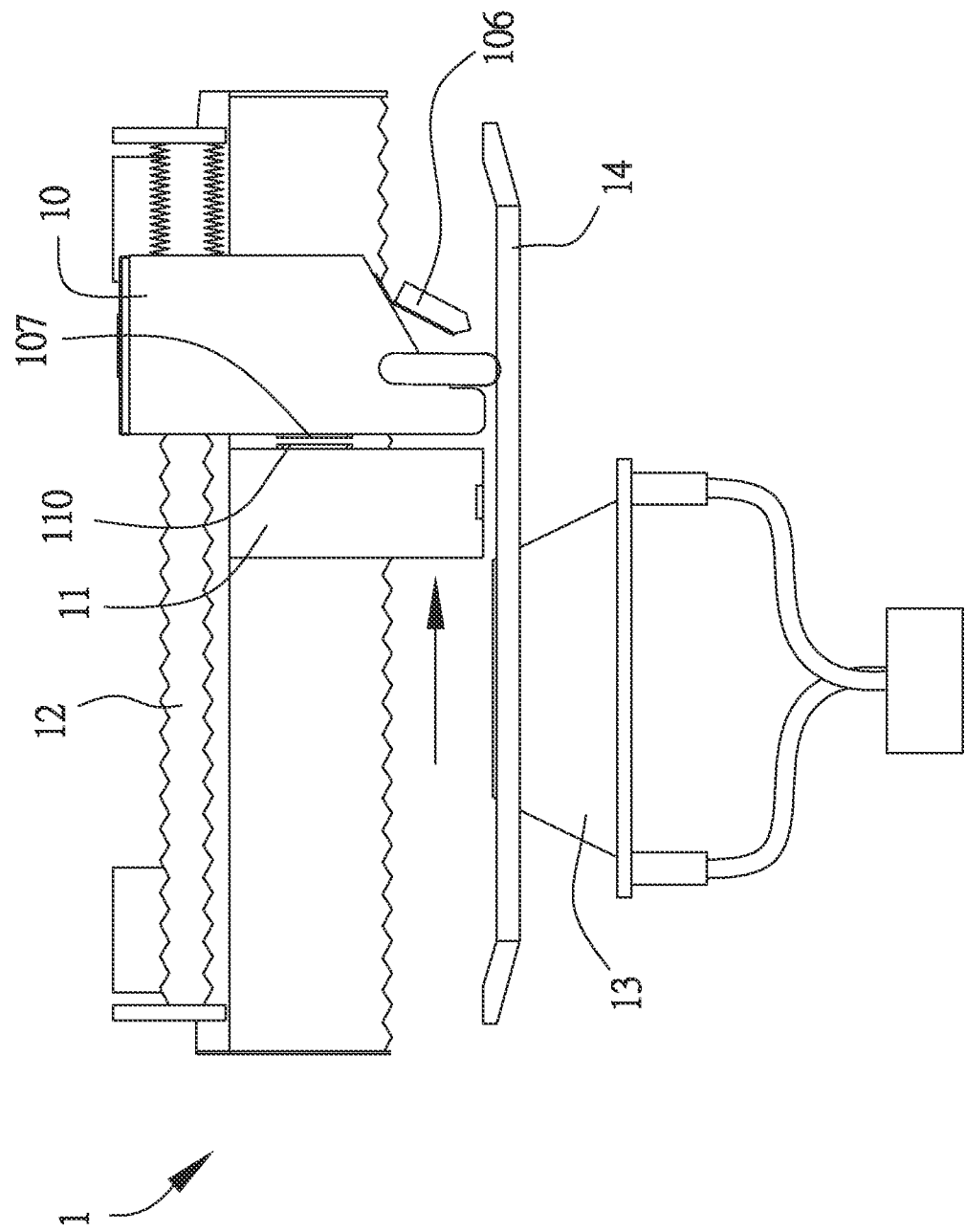
FIG. 3 is a schematic diagram of movement of the powder collecting device of the invention.
Figure 4:
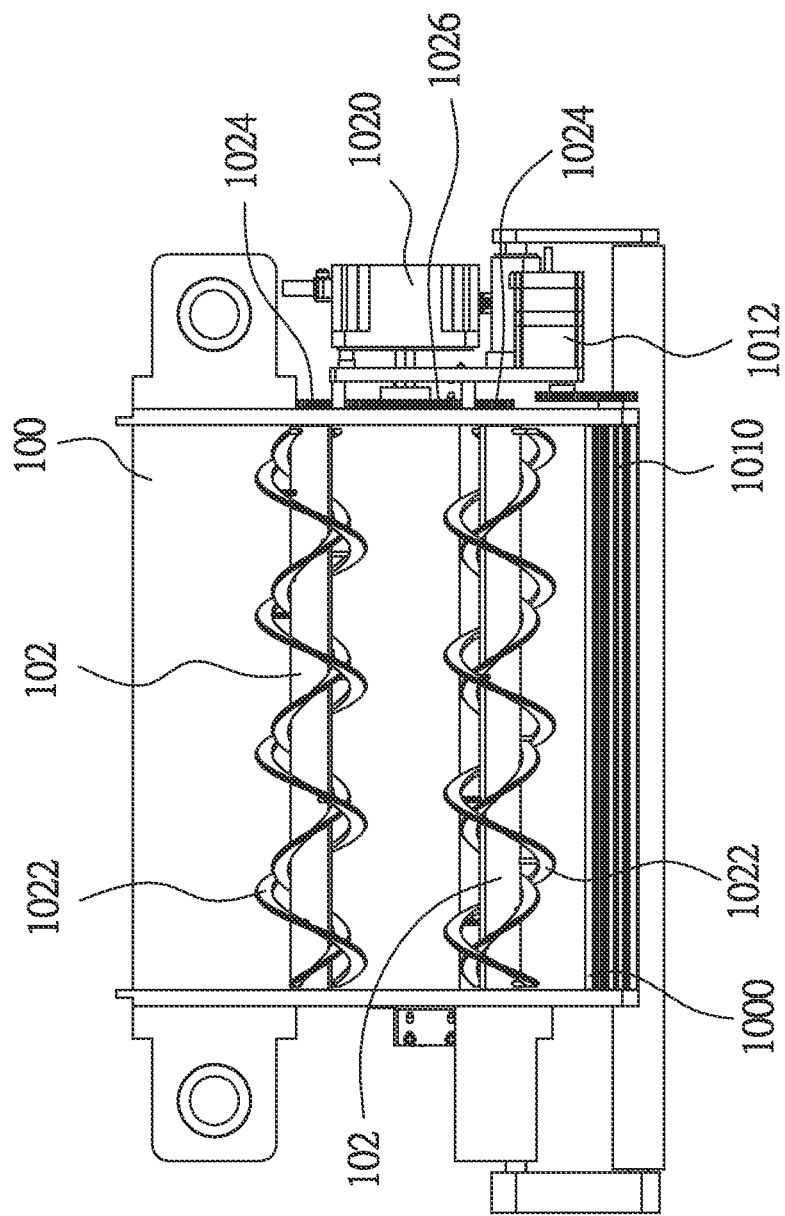
FIG. 4 is a schematic diagram of an internal structure of the powder collecting device of the invention for dispensing powder.
Figure 5:
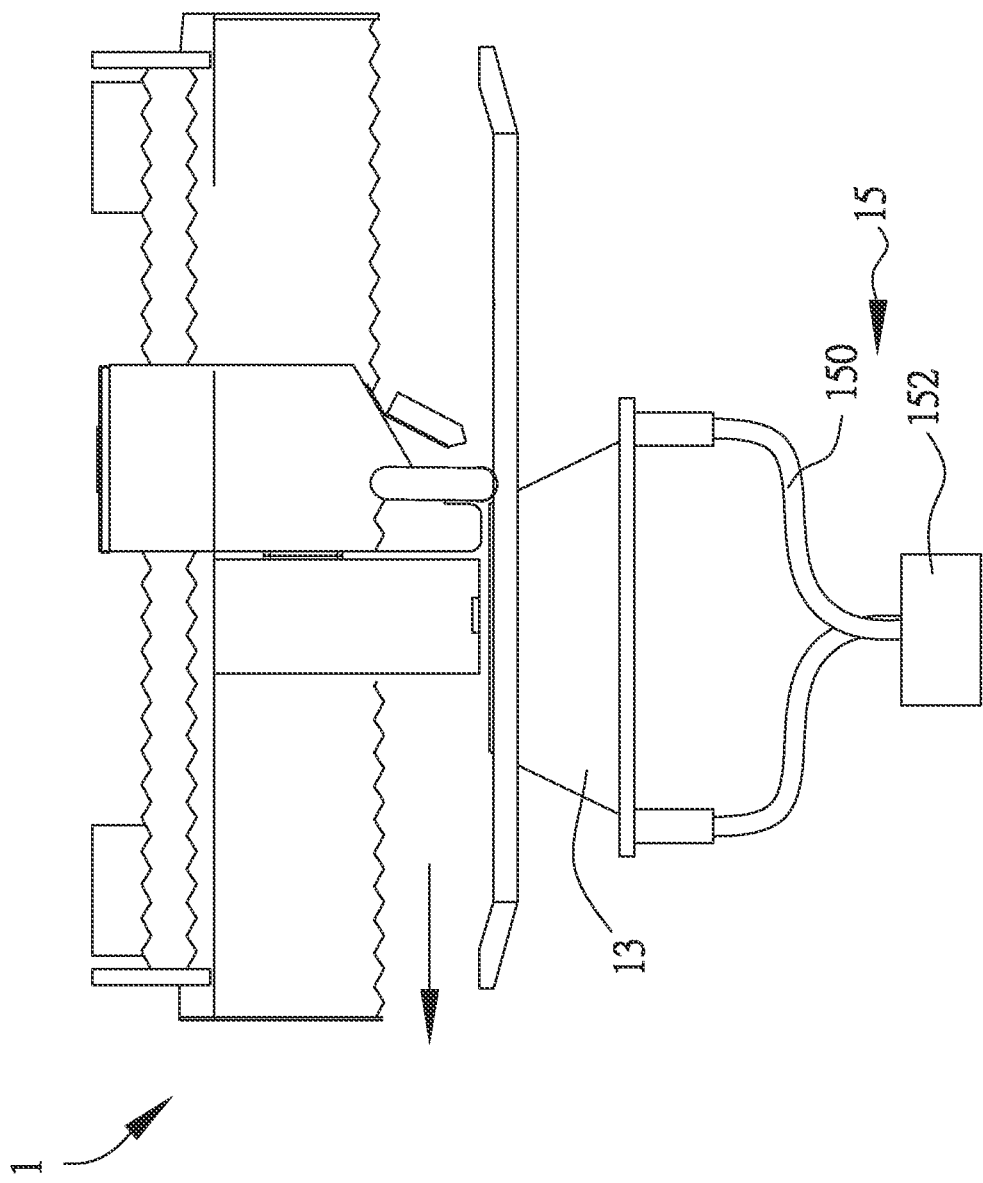
FIG. 5 is a schematic diagram of a position of the powder collecting device of the invention after movement.
Figure 6:
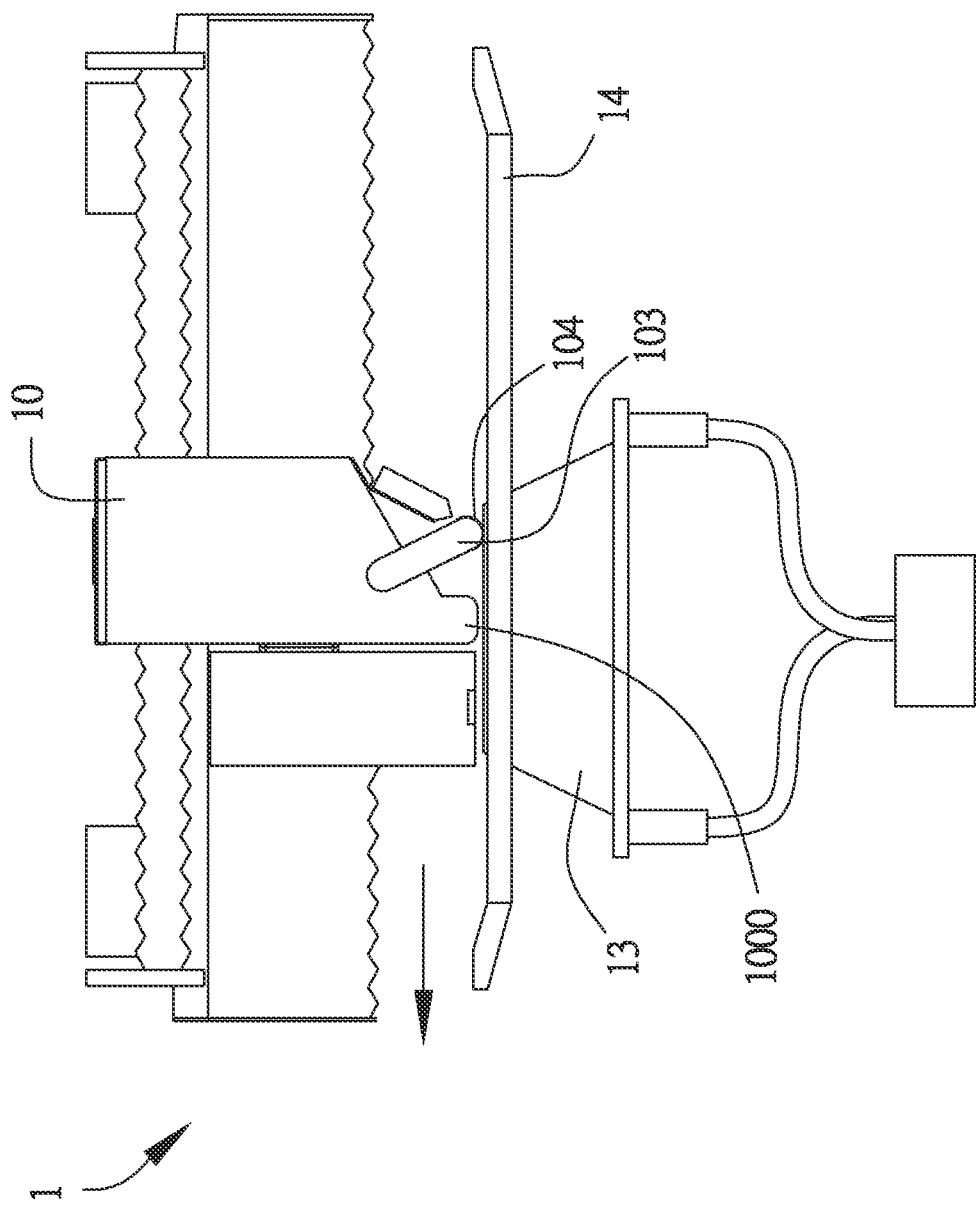
FIG. 6 is a schematic diagram of actuation of the powder collecting device of the invention for pressing powder.
Figure 7:
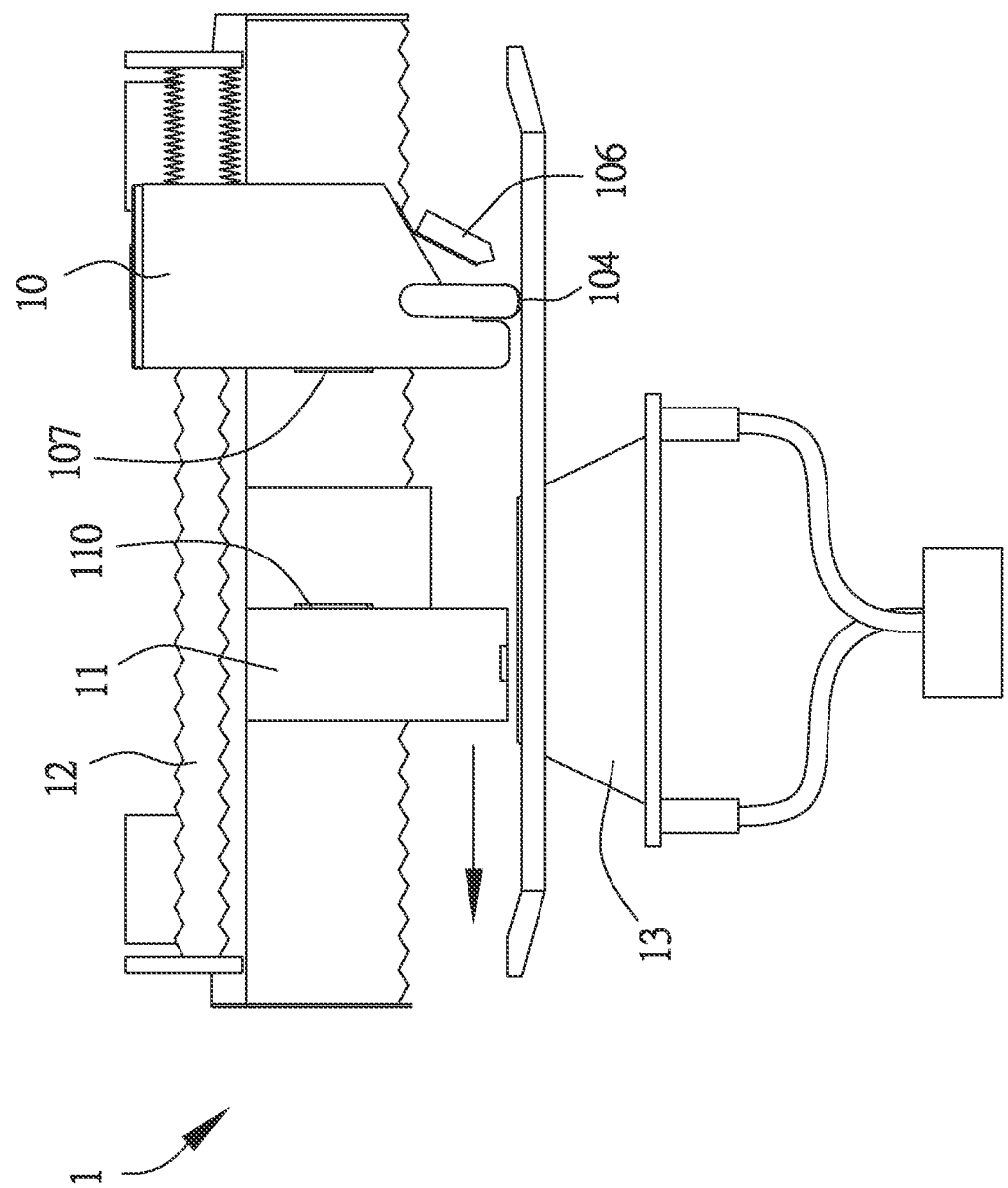
FIG. 7 is a schematic diagram of actuation of a printing device of the invention.

Please refer to FIGS. 3, 4, 5, 6 and 7 respectively for a schematic diagram of movement of the powder collecting device; a schematic diagram of an internal structure of the powder collecting device for dispensing powder; a schematic diagram of a position of the powder collecting device after movement; a schematic diagram of actuation of the powder collecting device for pressing powder; and a schematic diagram of actuation of a printing device of the invention. It can be known from FIGS. 3 to 5 that before printing by the magnetic powder dispensing structure 1 for tablet printing, dispensing of medicinal powder on the printing platform 13 has to be completed first. Dispensing of medicinal powder is achieved by moving the printing device 11 toward the powder collecting device 10 by the guide rod device 12. At this time, the first electromagnetic attraction device 107 and the second electromagnetic attraction device 110 respectively disposed on the powder collecting device 10 and the printing device 11 are energized to be magnetically attracted with each other, and the magnetically attracted powder collecting device 10 is driven to move in a direction toward the printing platform 13.

At this time, the transmission motor 1020 starts and drives the stirring rods 102 in the powder collecting box 100. Through meshing between the multiple gears 1024 and the single driving gear 1026, each of the stirring rods 102 equipped with the gear 1024 is capable of rotating forwardly and reversely, while the helical disturbance plate 1022 on each of the stirring rods 102 is capable of stirring the medicinal powder thoroughly, so that the medicinal powder will not be agglomerated or unevenly distributed, and then the powder is dispensed through the powder dispensing outlet 1000. In order to make the powder to dispense more evenly during powder dispensing, the powder dispensing roller 1010 located at the powder dispensing outlet 1000 is driven by the motor 1012 to rotate, and a surface of the powder dispensing roller 1010 is provided with a pattern similar to gear grooves, which is used to disperse the medicinal powder to improve an effect of distributing the dispensed powder evenly.

During powder dispensing, the dispensed powder that does not fall on the printing platform 13 will be recovered by the powder suction device 15 disposed under the printing platform 13. Since the powder suction device 15 is provided with the at least one powder suction tube 150 and the collection device 152 connected to the powder suction tube 150, the dispensed powder that does not fall on the printing platform 13 is sucked into the collection device 152 through the powder suction tube 150 to complete recovery.

During powder dispensing, since the pressing rod 104 is located behind the powder dispensing outlet 1000, when the powder is dispensing, the pressing rod 104 compresses the powder dispensing on the printing platform 13. Before contacting the printing platform 13, the pressing rod 104 moves along the guide rail 14, mainly to avoid collision due to an excessive height difference when the pressing rod 104 contacts the printing platform 13, resulting in possible damage. Since a height difference between the guide rail 14 and the printing platform 13 is sufficient to match a swing range of the rocker arm 103, damage caused by collision can be avoided when the pressing rod 104 straddles across the printing platform 13. Further explanation of the so-called height difference sufficient to match a swing range of the rocker arm 103 is as follows. After the powder collecting device 10 is driven by the printing device 11 to move in a direction toward the printing platform 13, the pressing rod 104 touches the printing platform 13 and at the same time each of the rocker arms 103 at two ends of the pressing rod 104 swings in an opposite direction, and a swing range of the rocker arm 103 is capable of just matching a height difference between the guide rail 14 and the printing platform 13, so there is no problem of excessive swinging.

After the pressing rod 104 is positioned on the printing platform 13, in addition to compressing the dispensing powder by a downward force provided by the rocker arms 103, because each of the rocker arms 103 is capable of swinging at different angles rather than being fixed at a vertical angle, excessive dispensing powder can be pushed forward, which helps to achieve a uniform effect when pressing the powder. In addition, the pressing rod 104 is driven by the driving motor 105 (refer to FIG. 2B), so the rotating pressing rod 104 is capable of flattening and compressing the dispensing powder, and excessive dispensing powder will be pushed to an end by the pressing rod 104.

After the above-mentioned powder pressing operation is completed, the printing device 11 pushes the powder collecting device 10 back to its original position, the first electromagnetic attraction device 107 and the second electromagnetic attraction device 110 are de-energized to detach from each other, and then tablet printing is performed on the printing platform 13 by the printing device 11, and the above steps can be repeated according to actual requirements.

In the above steps, when the pressing rod 104 is attached with too much medicinal powder, the cleaning device 106 can be used to spray off the medicinal powder, so that an effect of compressing the powder will not be affected by excessive medicinal powder attached on the pressing rod 104 during powder compressing.

It can be known from the above devices and operations that the printing device 11 and the powder collecting device 10 in the invention are capable of being magnetically attracted with each other or detached from each other by energizing or de-energizing the first electromagnetic attraction device 107 and the second electromagnetic attraction device 110, thereby the powder collecting device 10 can be driven when dispensing powder, and the printing device 11 is capable of operating independently during printing to improve an overall efficiency of powder dispensing and printing. In addition, through a swinging method of the rocker arm 103, the pressing rod 104 is capable of increasing a pressure on powder dispensing on the printing platform 11 to improve a quality of compaction and make the powder more compact, and the pressing rod 104 is capable of being driven by the driving motor 105 to take away excessive powder and spread the powder flatly while rolling without the problem of excessive powder at different positions.

The above-mentioned embodiments are merely exemplification to illustrate the principles and efficacies of the invention, and are not used to limit the invention. Any person having ordinary skill in the art can modify the above-mentioned embodiments without departing from the spirit and scope of the invention. Therefore, the scope of protection of the rights of the invention should be as listed in the appended claims hereinafter.

What is claimed is:

1. A magnetic powder dispensing structure for tablet printing comprising:

a powder collecting device including a powder collecting box for defining a powder dispensing outlet, a powder feeding device disposed in the powder collecting box and located at the powder dispensing outlet, a plurality of stirring rods disposed in the powder collecting box and driven to rotate by a transmission motor, a plurality of rocker arms respectively disposed on two sides of the powder collecting box, a pressing rod pivotally disposed between two of the rocker arms and driven by a driving motor, a cleaning device disposed on the powder collecting device and defining an air outlet corresponding to the pressing rod, and a first electromagnetic attraction device; and a printing device provided with a second electromagnetic attraction device capable of being energized to magnetically attract with the first electromagnetic attraction device or being de-energized to detach from the first electromagnetic attraction device, the printing device and the powder collecting device being set on a guide rod device, the printing device being capable of moving laterally through the guide rod device, the printing device being capable of magnetically attracting with the first electromagnetic attraction device via the second electromagnetic attraction device, so that the powder collecting device being capable of moving together laterally and being driven to move in a direction toward a printing platform, and powder being dispensed onto the printing platform through the powder feeding device at the same time, the pressing rod butting against the printing platform and swinging in a direction opposite to movement of the powder collecting device through the rocker arms, the powder collecting device completing powder dispensing and moving to an initial position, the first electromagnetic attraction device and the second electromagnetic attraction device being de-energized to detach from each other, and the printing device moving to the printing platform for printing.

2. The magnetic powder dispensing structure for tablet printing as claimed in claim 1, further comprising a guide rail disposed below the pressing rod and disposed at a height lower than the printing platform, and a height difference between the guide rail and the printing platform being sufficient to match a swing range of the rocker arm.

3. The magnetic powder dispensing structure for tablet printing as claimed in claim 1, wherein the powder feeding device comprises a powder dispensing roller pivotally disposed in the powder collecting box and located at the powder dispensing outlet, and a motor connected to the powder dispensing roller and driving the powder dispensing roller to rotate.

4. The magnetic powder dispensing structure for tablet printing as claimed in claim 1, further comprising a connecting member connected between the pressing rod and the driving motor to transmit power.

5. The magnetic powder dispensing structure for tablet printing as claimed in claim 4, wherein the connecting member is a belt or a chain.

6. The magnetic powder dispensing structure for tablet printing as claimed in claim 1, wherein each of the stirring rods is provided with a helical disturbance plate.

7. The magnetic powder dispensing structure for tablet printing as claimed in claim 1, further comprising a powder suction device disposed below the printing platform and provided with at least one powder suction tube and a collection device connected to the powder suction tube.

8. The magnetic powder dispensing structure for tablet printing as claimed in claim 1, wherein one end of each of the stirring rods is provided with a gear, and the transmission motor is provided with a driving gear meshed with each of the gears, so that each of the stirring rods rotates forwardly and reversely.

* * * * *